US009695987B2

United States Patent
Ochiai et al.

(10) Patent No.: US 9,695,987 B2
(45) Date of Patent: Jul. 4, 2017

(54) BALL TAP (71) Applicant: Kane Kougyou Co., Ltd., Komaki-shi, Aichi (JP)

(72) Inventors: Masaru Ochiai, Komaki (JP); Nobuyuki Matsuura, Komaki (JP)

(73) Assignee: KANE KOUGYOU CO., LTD., Komaki-shi, Aichi (JP)

( * ) Notice: Subject to any disclaimer, the term of this patent is extended or adjusted under 35 U.S.C. 154(b) by 20 days.

(21) Appl. No.: 14/849,974

(22) Filed: Sep. 10, 2015

(65) Prior Publication Data
US 2016/0076703 A1    Mar. 17, 2016

(30) Foreign Application Priority Data
Sep. 17, 2014    (JP) .................................. 2014-188602

(51) Int. Cl.
| F17C 13/04 | (2006.01) |
| E03B 1/04 | (2006.01) |
| F16K 31/26 | (2006.01) |

(52) U.S. Cl.
CPC .............. *F17C 13/04* (2013.01); *E03B 1/042* (2013.01); *F16K 31/265* (2013.01); *E03B 2001/047* (2013.01); *F17C 2227/04* (2013.01); *F17C 2250/0413* (2013.01); *F17C 2250/072* (2013.01); *Y10T 137/2675* (2015.04);
(Continued)

(58) Field of Classification Search
CPC   F17C 13/04; F17C 2227/04; F17C 2250/072; F17C 2250/075; F17C 2250/077; F17C 2250/0413; F16K 31/265; F16K 31/26; F16K 31/24; F16K 31/20; F16K 31/18; E03B 1/042; E03B 1/041; E03B 1/04; E03B 2001/047; Y10T 137/7439; Y10T 137/7446; Y10T 137/7465;
(Continued)

(56) References Cited

U.S. PATENT DOCUMENTS

| 267,736 A | * | 11/1882 | Young .................... F16K 31/26 |
| | | | 137/446 |
| 1,181,716 A | * | 5/1916 | Allgeyer ................ F16K 31/26 |
| | | | 137/413 |

(Continued)

FOREIGN PATENT DOCUMENTS

| FR | EP 1070908 A1 * | 1/2001 | ............. F16K 31/20 |
| GB | 190900380 A * | 0/1909 | ............. F16K 31/26 |

(Continued)

*Primary Examiner* — Kevin Murphy
*Assistant Examiner* — David Colon Morales
(74) *Attorney, Agent, or Firm* — Flynn, Thiel, Boutell & Tanis, P.C.

(57) ABSTRACT

In a ball tap 1, a valving element 3 includes a valve part 10 provided with a contact projection part 9 that can come into close contact with a valve seat 7 when the valving element 3 is closed, and a flange part 11 having a circular ring shape in plan view which continues downward from the rim of the valve part 10 and is slidable like a piston in the secondary side flow passage 5, and the left and right half circumferences of the upper surface of the flange part 11 have bilaterally symmetrical shapes curved downward in arch shapes, and the left and right lower limit portions of the upper surface of the flange part are set so as to be positioned at the same heights as those of the lower end edges of drainage ports 8.

4 Claims, 8 Drawing Sheets

(52) U.S. Cl.
CPC .... *Y10T 137/7439* (2015.04); *Y10T 137/7465* (2015.04); *Y10T 137/7475* (2015.04)

(58) Field of Classification Search
CPC ......... Y10T 137/7468; Y10T 137/7475; Y10T 137/7358; Y10T 137/731; Y10T 137/2675
USPC .................................................. 251/359, 333
See application file for complete search history.

(56) References Cited

U.S. PATENT DOCUMENTS

| | | | | |
|---|---|---|---|---|
| 1,302,538 A * | 5/1919 | Gulick | ................... | F16K 31/34 137/413 |
| 1,579,140 A * | 3/1926 | Phillips | ................... | F16K 47/02 137/434 |
| 2,004,423 A * | 6/1935 | Warren | ................ | F16K 31/265 137/409 |
| 2,664,261 A * | 12/1953 | Stephany | ................ | F16K 47/02 137/218 |
| 2,715,415 A * | 8/1955 | Tucker | ..................... | A01K 7/04 137/442 |
| 2,724,404 A * | 11/1955 | Kass | ....................... | F16K 21/16 137/411 |
| 2,875,977 A * | 3/1959 | Stone | ...................... | F16K 31/24 137/451 |
| 3,027,134 A * | 3/1962 | Nichols | ................... | F16K 31/26 251/175 |
| 3,096,068 A * | 7/1963 | Claridge | ............... | F16K 39/022 137/422 |
| 3,570,527 A * | 3/1971 | Fritz | ........................ | A01K 7/04 137/421 |
| 3,897,042 A * | 7/1975 | Kachergis | ............... | F16K 31/26 137/533.21 |
| 4,655,244 A * | 4/1987 | Park | ........................ | F16K 31/26 137/412 |
| 4,762,142 A * | 8/1988 | Tams | ...................... | F16K 31/26 137/315.08 |
| 4,796,650 A * | 1/1989 | Hwang | ................... | F16K 31/26 137/443 |
| 5,230,361 A * | 7/1993 | Carr | ...................... | F16K 31/265 137/416 |
| 5,772,928 A * | 6/1998 | Holtzman | ................ | F02M 5/12 137/435 |
| 5,857,483 A * | 1/1999 | Stone, III | ................ | F16K 31/26 137/443 |
| 6,076,546 A * | 6/2000 | Waters | .................... | F16K 31/26 137/390 |
| 6,679,286 B2 * | 1/2004 | Kato | ..................... | F16K 21/185 137/429 |
| 6,823,890 B1 * | 11/2004 | Hwang | .................. | F16K 31/26 137/443 |
| 7,219,686 B2 * | 5/2007 | Schmitz | ................. | F16K 1/305 116/229 |
| 7,243,669 B2 * | 7/2007 | Vaughan | ................ | F16K 15/18 137/1 |
| 7,647,938 B2 * | 1/2010 | Jobe | .......................... | E03D 1/32 137/15.26 |
| 8,397,747 B2 * | 3/2013 | Hwang | ................... | F16K 31/26 137/426 |
| 2002/0000248 A1 * | 1/2002 | Herlihy | .................. | F16K 31/34 137/413 |
| 2009/0007324 A1 * | 1/2009 | Pule | ......................... | E03D 1/32 4/395 |
| 2012/0183415 A1 * | 7/2012 | Collins | ................. | F04B 49/025 417/131 |

FOREIGN PATENT DOCUMENTS

| | | | | |
|---|---|---|---|---|
| GB | 191206868 A | * | 0/1913 | ............ F16K 31/26 |
| GB | 139631 A | * | 3/1920 | ............ F16K 31/26 |
| GB | 207853 A | * | 12/1923 | ............ F16K 31/26 |
| GB | 214013 A | * | 4/1924 | ............ F16K 31/26 |
| GB | 444394 A | * | 3/1936 | ........... F16K 31/265 |
| JP | 2913085 B2 | | 4/1999 | |
| JP | 2913085 B2 | * | 6/1999 | |
| NZ | WO 2013129943 A1 | * | 9/2013 | ......... F16K 31/3835 |

* cited by examiner

BALL TAP

TECHNICAL FIELD

The present invention relates to a ball tap having a function of discharging foreign matter mixed in water to be supplied.

BACKGROUND ART

Patent document 1 discloses a general ball tap conventionally used which uses a method in which a valve orifice is opened and closed by a valving element via a lever type booster mechanism according to the swinging of a float that moves in response to water level changes, and a water level inside a water receiving tank is controlled by the balance between the buoyancy of the float and the water supply pressure.

In this ball tap, a strainer is incorporated on the primary side of the valve orifice, and by this strainer, foreign matter such as iron powder, sand, scale, and contaminants contained in water to be supplied are prevented from entering the secondary side of the valve orifice, and accordingly, the foreign matter is prevented from being caught between a valve seat provided around the secondary side of the valve orifice and a valving element provided in a manner enabling it to seat on and separate from the valve seat.

Foreign matter adheres to and deposits on the strainer during use, so that the strainer had to be periodically cleaned so as not to be clogged and cause an operation failure of the ball tap.

PRIOR ART DOCUMENT

Patent Document

Patent Document 1 Japanese Patent No. 2913085

SUMMARY OF THE INVENTION

Problem to be Solved by the Invention

In a rainwater storage system which stores rainwater that fell on the roof of a building such as an apartment building or a house and utilizes the rainwater as general service water (recycled wastewater) for flushing a toilet or washing a car etc., when the ball tap constituted as described above is used in a rainwater storage tank that directly stores rainwater to manage and control the rainwater storage volume inside the rainwater storage tank, since foreign matter such as leaves naturally contained in rainwater are large, unlike the above-described foreign matter that is mixed in clean water, and the mixing rate of the large foreign matter is high, the majority of the mesh of a strainer is frequently clogged, and unless the strainer is frequently cleaned, a water conduction failure may occur, and it may result in an operational failure of the ball tap.

Therefore, an object of the present invention is to provide a ball tap always capable of operating excellently by discharging, along with drainage without a built-in strainer, all of the foreign matter such as iron powder, sand, scale, and contaminants comparatively larger than those mixed in water to be supplied regardless of whether the water to be supplied is clean water or recycled wastewater.

Means for Solving the Problem

In view of the above-described problem, a ball tap according to the present invention is constituted so as to keep a water level inside a water receiving tank at a water level set in advance by providing a valving element linked to a lever rod that swings vertically according to the water level inside the water receiving tank in a manner that enables the valving element to seat on and separate from a valve seat provided on a secondary side opening end face of a valve orifice that opens on the same axis as that of a secondary side flow passage provided vertically inside a valve body, the valving element includes a valve part provided with a contact projection part that can come into close contact with the valve seat when the valving element is closed, and a flange part having a circular ring shape in plan view which continues downward from the rim of the valve part and is slidable like a piston in the secondary side flow passage, and the left and right half circumferences of the upper surface of the flange part have bilaterally symmetrical shapes curved downward in arch shapes, and the left and right lower limit portions of the upper surface of the flange part are set so as to be positioned at the same heights as those of the lower end edges of drainage ports formed to expand on the left and right of the secondary side flow passage or slightly higher than the lower end edges when the valving element is fully opened.

The valve orifice is formed into a funnel shape that gradually decreases in diameter from its primary side opening toward the secondary side, the valve part of the valving element is formed into a right circular cone shape that gradually increases in diameter toward the secondary side, and the contact projection part is provided on a circumference of the valve part.

Further, a ventilation passage communicating with the outside air is provided around the secondary side opening of the valve orifice so as to allow air to mix in a water flow that passes through the valve orifice when the valve is opened.

In a case where the valve body is formed as an angle type in which the primary side flow passage whose axis is horizontal and the secondary side flow passage whose axis is vertical are orthogonal to each other, a dam is provided at a portion corresponding to the inside corner portion inside the primary side flow passage on the rim of the primary side opening of the valve orifice.

Effects of the Invention

In fact, since the ball tap according to the present invention is constituted as described above, a water flow that passes through the valve orifice when the valving element is opened is guided to the flange part continuing downward from the rim of the valve part, however, this flange part is formed to have a circular ring shape in plan view so as to be slidable like a piston in the secondary side flow passage, so that the whole valving element receives the water flow and prevents it from further flowing down to the secondary side of the valving element, and further, the left and right half circumferences of the upper surface of the flange part have bilaterally symmetrical shapes curved downward in arch shapes, so that the upper surface of the flange part slopes from the front and rear upper limit portions to the left and right lower limit portions, and along this slope, all of the water flow that is prevented from flowing to the downstream by the valving element as described above is bifurcated to the left and right, and even if comparatively large foreign matter such as pebbles and leaves mix in the respective bifurcated flows, the lower limit portions of the upper surface of the flange part are set so as to be positioned at the same heights as the lower end edges of the drainage ports or slightly higher than the lower end edges when the valving element is fully opened, so that a failure in which the foreign matter that flowed down to the lower limit portions together with the water flow remains there does not occur, and all of the foreign matter can always be discharged and removed to the outside from drainage ports always disposed on the left and right of the valving element upstream when the valve is opened, and thereafter, even while the valving element moves in a valve closing direction, without the occurrence of a failure in which fine foreign matter enters the gap between the flange part and the secondary side flow passage and obstructs the sliding of the valving element in the secondary side flow passage, foreign matter can be naturally prevented from being caught between the valving element and the valve seat, and excellent valve opening and closing operations of the valving element can always be obtained.

Therefore, the present invention can provide a ball tap that is also applicable to water level control of a water tank that directly stores rainwater without filtering it.

The valve orifice is formed into a funnel shape that gradually decreases in diameter from its primary side opening toward the secondary side, the valve part of the valving element is formed into a right circular cone shape that gradually increases in diameter toward the secondary side, and the contact projection part is provided on a circumference of the valve part, so that the inner circumferential surface of the valve orifice and the surface of the valving element sloped down toward the secondary side, and therefore, a series of water channels that can make foreign matter easily slide and fall without adhering to and remaining on the inner circumferential surface of the valve orifice and the surface of the valving element, and make foreign matter flow down to the lower limit portions of the valving element flange part together with the water flow when the valving element is opened, and discharge all of the foreign matter to the outside from the drainage ports can be constituted, and therefore, a ball tap that can prevent foreign matter from being caught between the valving element and the valve seat and always operate excellently can be provided.

A ventilation passage communicating with the outside air is provided around the secondary side opening of the valve orifice so as to allow air to mix in a water flow that passes through the valve orifice when the valve is opened, so that air supplied through the ventilation passage around the valve orifice is involved and mixed in a water flow flowing down from the valve orifice to the secondary side, and the water flow is accordingly made to flow down as bubbled water, and bubbles mixed in the bubbled water can separate foreign matter that tries to adhere to the surface of the valving element, and accordingly, the foreign matter can be discharged together with the water flow from the drainage ports to the outside without fail, and the foreign matter can be prevented from being caught between the valving element and the valve seat.

By forming the valve orifice into the funnel shape as described above, the force of the water flow can be further increased, the atmospheric pressure near the water flow is significantly lowered, and air supplied through the ventilation passage can be strongly involved in the water flow and bubbled water which was increasingly mixed with air can be made to flow down, so that the action of separating the foreign matter that tries to adhere to the surface of the valving element can be further promoted.

The valve body is formed as an angle type in which the primary side flow passage whose axis is horizontal and the secondary side flow passage whose axis is vertical are orthogonal to each other, and a dam is provided at a portion corresponding to the inside corner portion inside the primary side flow passage on the rim of the primary side opening of the valve orifice, so that in such a case where water to be supplied on the primary side is small in amount, fine foreign matter such as sand contained in the water to be supplied can be dammed up by the dam so as not to fall down to the surface of the valving element during the closing of the valving element, and fine foreign matter can be prevented from being caught between the valving element and the valve seat according to valve opening and closing operations of the valving element, and effects of these are great in practical use.

BEST MODE FOR CARRYING OUT THE INVENTION

Hereinafter, an embodiment of the present invention is described with reference to the drawings.

A ball tap 1 according to the present invention is used in a water receiving tank (not shown) that directly stores rainwater without filtering it to manage and control a water storage amount inside the water receiving tank in a rainwater storage system that stores mainly rainwater that fell on the roof of a building such as an apartment building or a house and utilizes the rainwater as general service water (recycled wastewater) for flushing a toilet or washing a car, etc.

As a matter of course, the ball tap 1 according to the present invention can also be used in a water receiving tank that stores and manages clean water in an apartment building, etc., and therefore, the ball tap can be installed inside a water receiving tank for clean water or recycled wastewater.

This ball tap 1 is constituted so as to keep the water level inside a water receiving tank at a water level set in advance by providing a valving element 3 linked to a lever rod 2 that swings vertically according to the water level inside the water receiving tank in a manner enabling the valving element 3 to seat on and separate from a valve seat 7 provided on the end face of the secondary side opening 6b of a valve orifice 6 opened on the same axis (concentrically with) as a secondary side flow passage 5 provided vertically inside a valve body 4, and the ball tap 1 is provided with a function to discharge foreign matter such as iron powder, sand, scale, and contaminants comparatively larger than those, etc., mixed in water to be supplied regardless of whether the water to be supplied is clean water or recycled wastewater.

Therefore, this ball tap 1 is not equipped with a built-in strainer that was disposed on the primary side of a valve orifice inside a valve body of a conventional ball tap.

As a most characteristic constitution in the present invention, the valving element 3 being open distributes a water flow to drainage ports 8 that are substantially rectangular in a side view and formed to have predetermined heights and expand along the circumferential direction on the left and right of the secondary side flow passage 5 in the valve body 4, and foreign matter is discharged together with the water flow from the drainage ports 8.

The valving element 3 includes a valve part 10 that is formed into a right circular cone shape gradually increasing in diameter toward the secondary side, and is provided with a contact projection part 9 made of synthetic rubber on a circumference of the surface of the valve part 10 and closely contactable with the valve seat 7 when the valving element 3 is closed, and a flange part 11 having a circular ring shape in plan view which continues downward from the rim of the large diameter portion of the lower end of the valve part 10, and is slidable like a piston in the secondary side flow passage 5.

The left and right half circumferences of the upper surface of the flange part 11 have bilaterally symmetrical shapes curved downward in arch shapes, and the left and right lower limit portions 11b of the upper surface of the flange part 11 are set so as to be positioned at the same heights as those of the lower end edges 8a of the drainage ports 8 or slightly higher than the lower end edges as shown in the illustrated example when the valving element 3 is fully opened.

Figure 8:
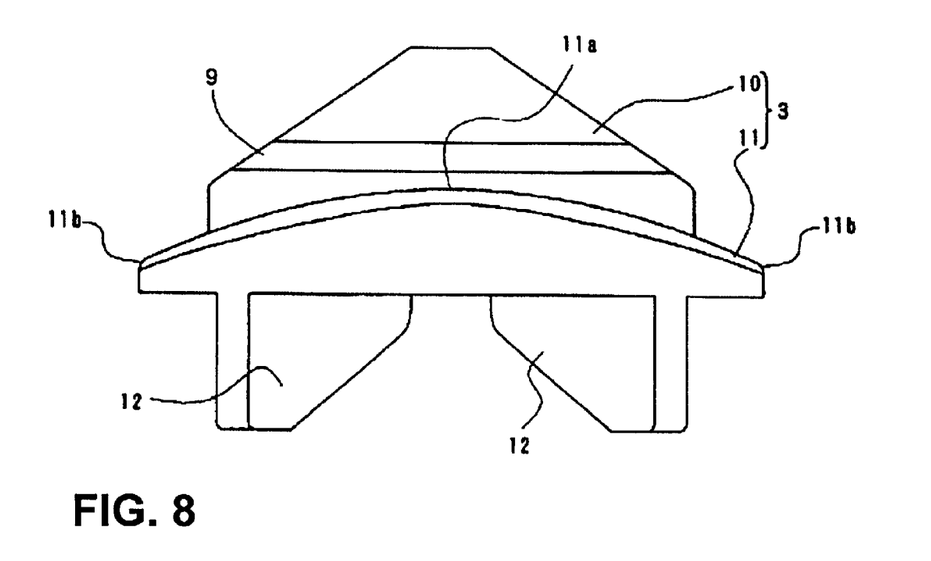
FIG. 8 is a front view of the valving element.
Figure 9:
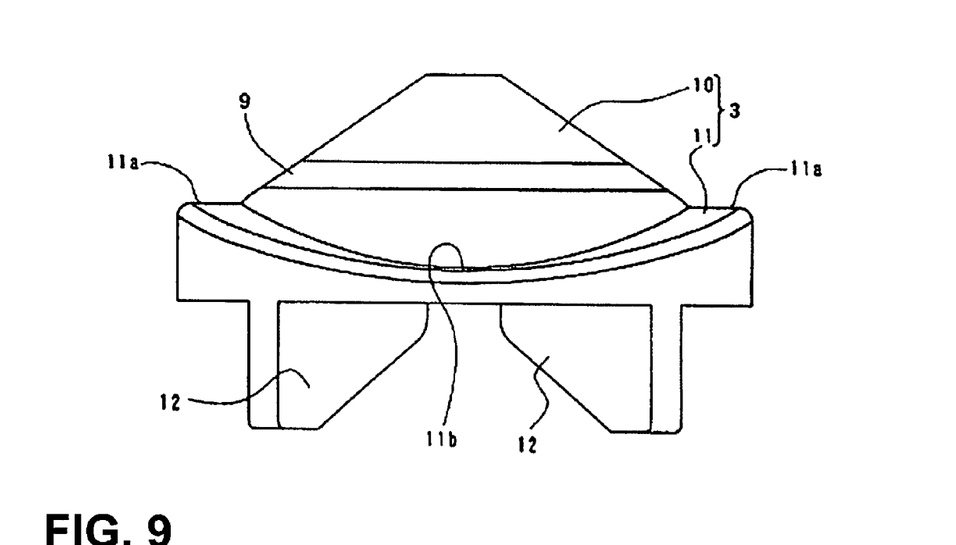
FIG. 9 is a side view of the valving element.
Figure 10:
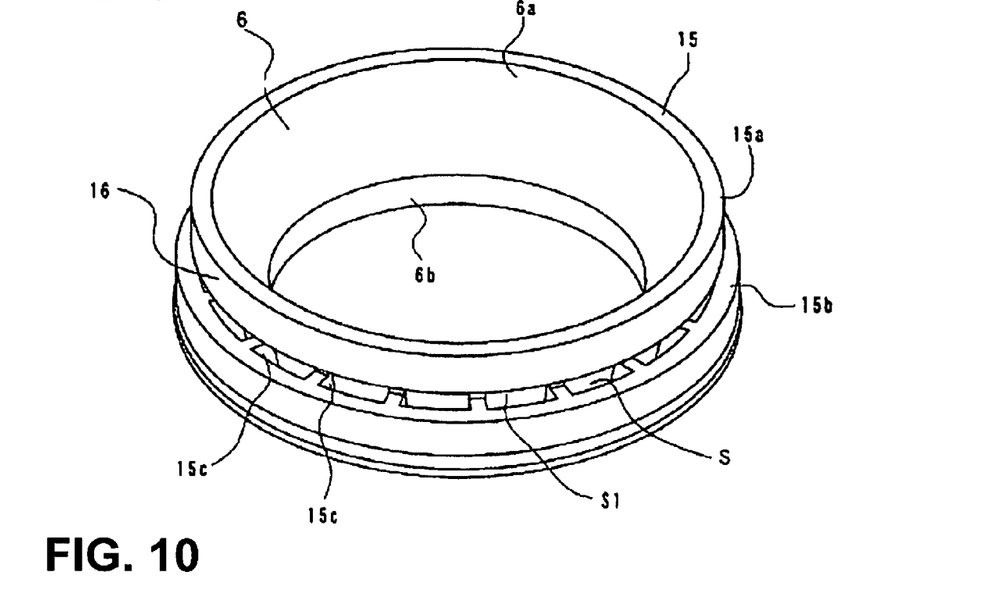
FIG. 10 is a perspective view of a seat ring.
Figure 11:
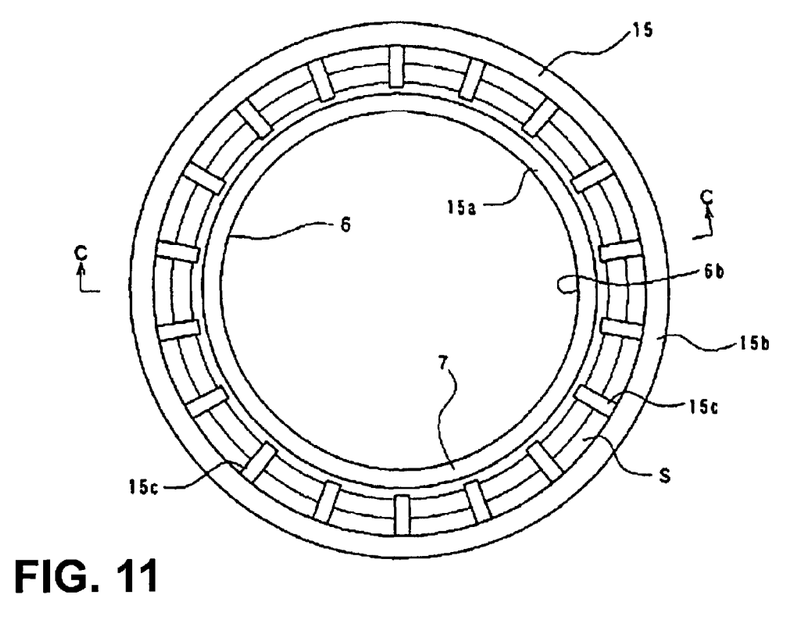
FIG. 11 is a bottom view of the same.

The front and rear upper limit portions 11a of the upper surface of the flange part 11 are curved upward in arch shapes as shown in FIG. 8, and the upper surface of the flange part 11 have wave-like undulations so as to slope from the respective front and rear upper limit portions 11a to the left and right lower limit portions 11b.

Four guide blades 12 the outside edges of which slide on the wall surface of the secondary side flow passage 5, are provided in cross directions so as to droop from the lower portion of the valving element 3 (flange part 11).

The valve body 4 leads to an inlet 13 that is connected to a water supply pipe (not shown), and is formed as an angle type in which the primary side flow passage 14 whose axis is horizontal and the secondary side flow passage 5 whose axis is vertical are orthogonal to each other, and in the secondary side flow passage 5 inside the valve body 4, the lower side of a seat ring 15 that has the valve orifice 6 is inserted and fixed into an outfall 4a that is the boundary with the primary side flow passage 14.

Figure 12:
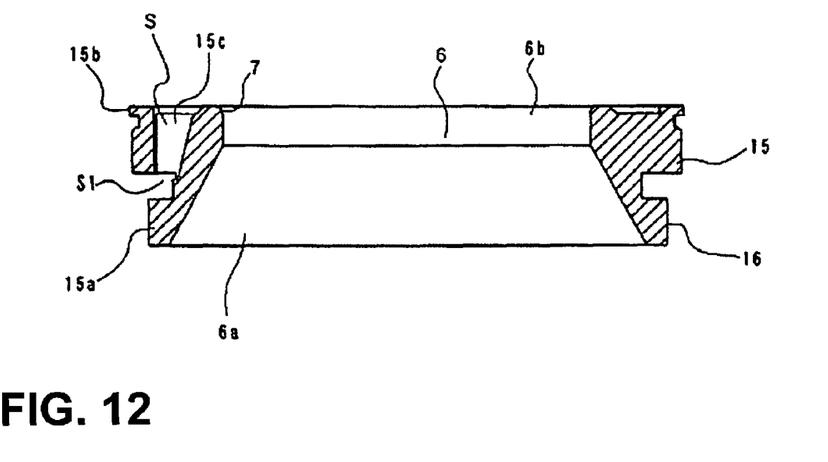
FIG. 12 is a sectional view taken along C-C in FIG. 11.

The seat ring 15 consists mainly of a forming ring (hereinafter, referred to as a valve orifice ring 15a) for forming the valve orifice 6 which is formed into a funnel shape gradually decreasing in diameter from the primary side opening 6a toward the secondary side, and provided with a shallow cylinder opening which continues downward from the smallest diameter portion of the valve orifice 6 and the contact projection part 9 is stably contactable with and separable from, an outer frame ring 15b that surrounds the lower side (upside down in FIG. 12) outer circumference of the valve orifice ring 15a at a predetermined distance, and multiple space holding plates 15c that are laid in the radial directions between the outer frame ring 15b and the valve orifice ring 15a so as to hold an annular gap S between these.

In the valve orifice ring 15a (valve orifice 6), the rim 16 of the primary side opening 6a provided at a position higher than the upper end of the outer frame ring 15b via a predetermined annular space S1 has a circumferential surface having a predetermined thickness and a predetermined height the generatrix of which is vertical.

The lower side of the valve orifice ring 15a lower than the lower portion of the rim 16 of the primary side opening 6a is inserted and fitted into the outfall 4a, and the rim 16 of the primary side opening 6a is protruded to be higher than the outfall 4a.

Figure 1:
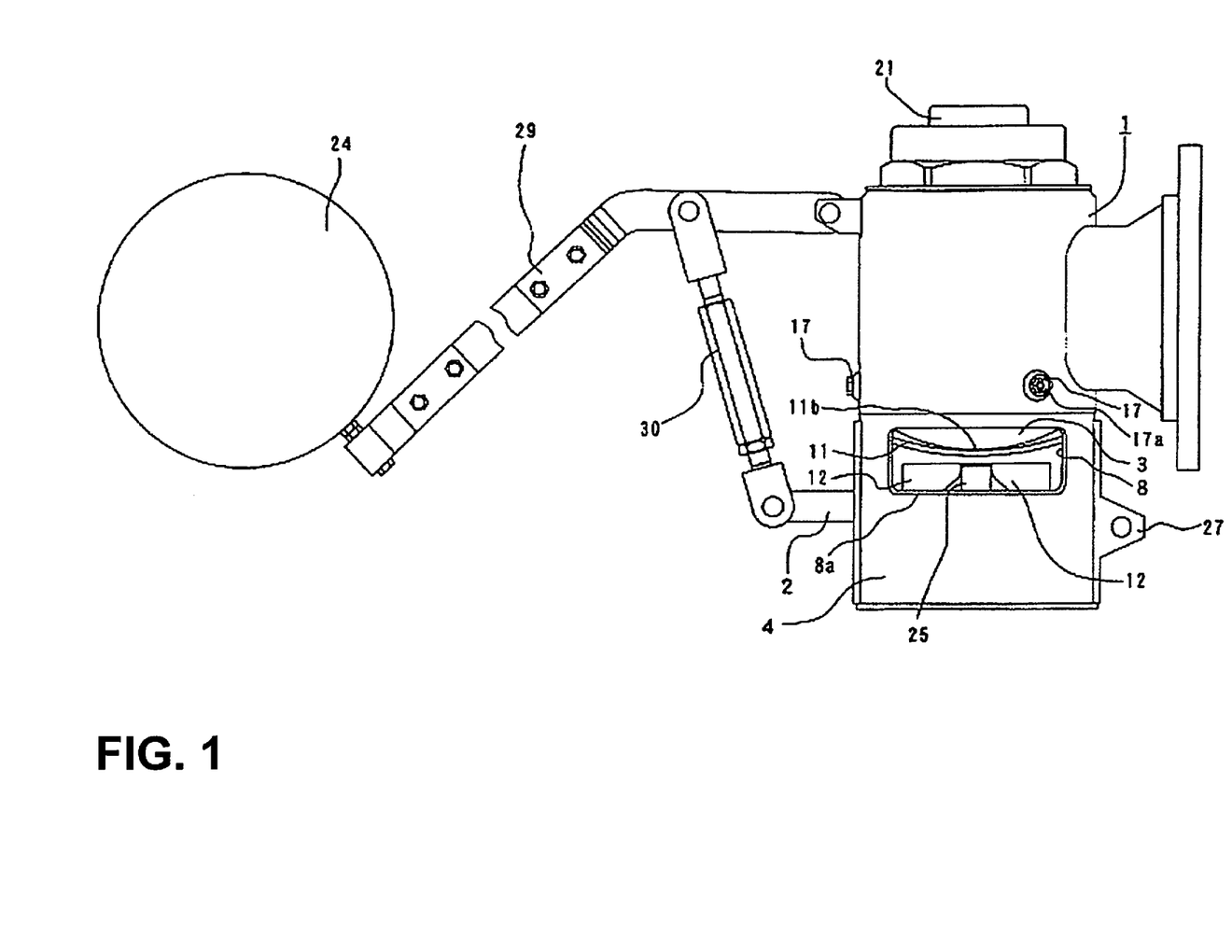
FIG. 1 is a side view showing a valve closed state of a ball tap according to the present invention.
Figure 2:
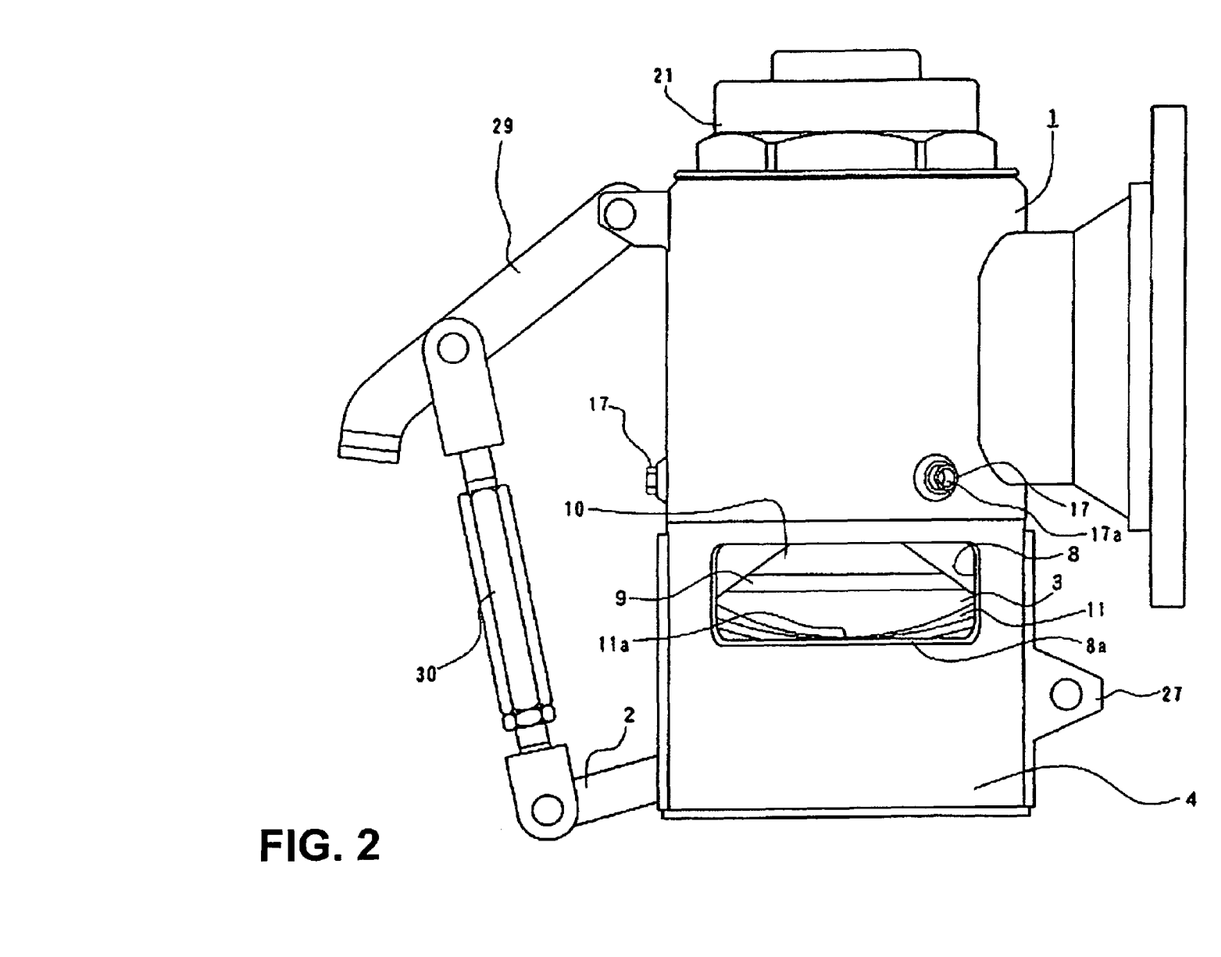
FIG. 2 is a side view showing a fully opened state of the same ball tap.
Figure 3:
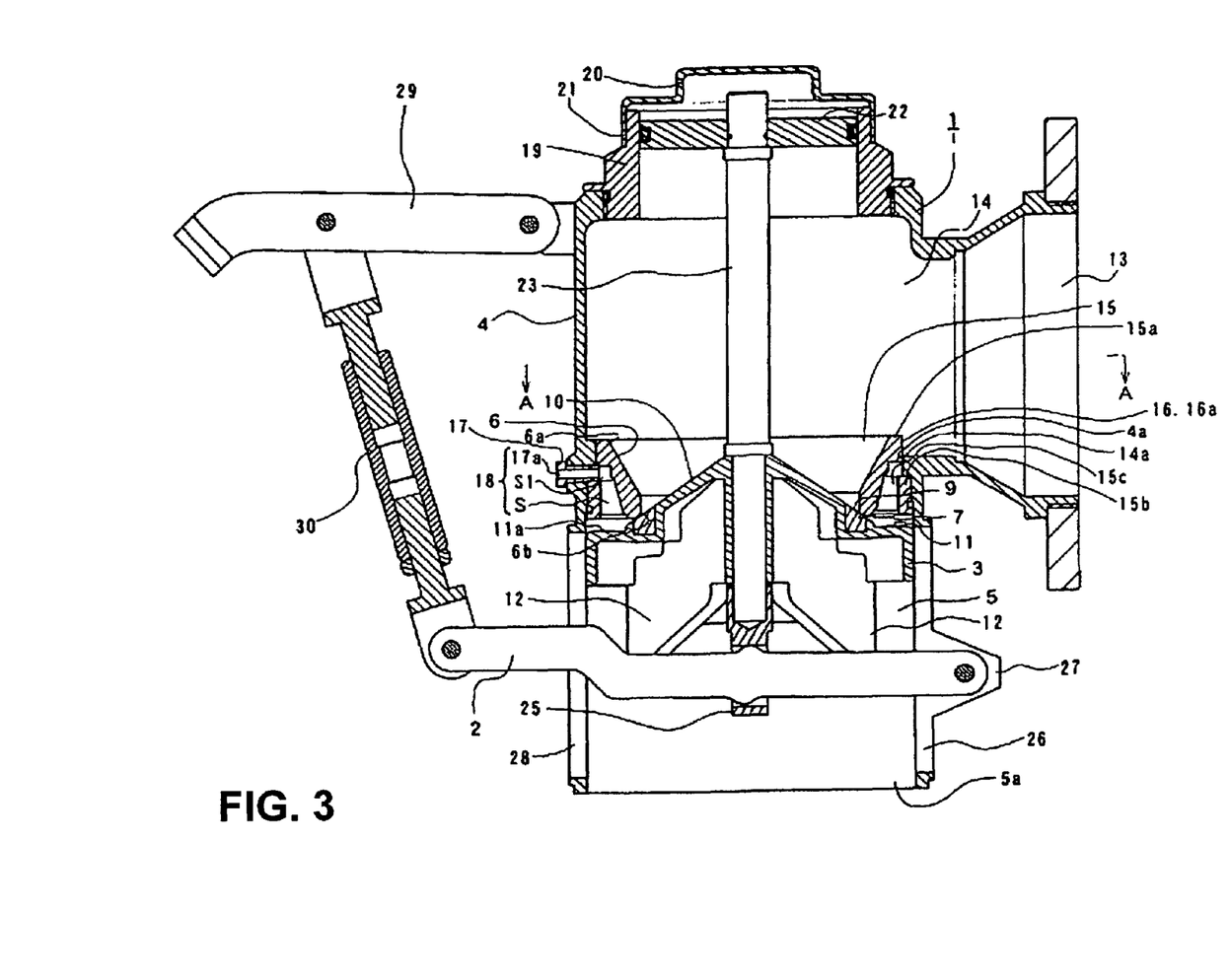
FIG. 3 is a central longitudinal sectional view of FIG. 1.
Figure 4:
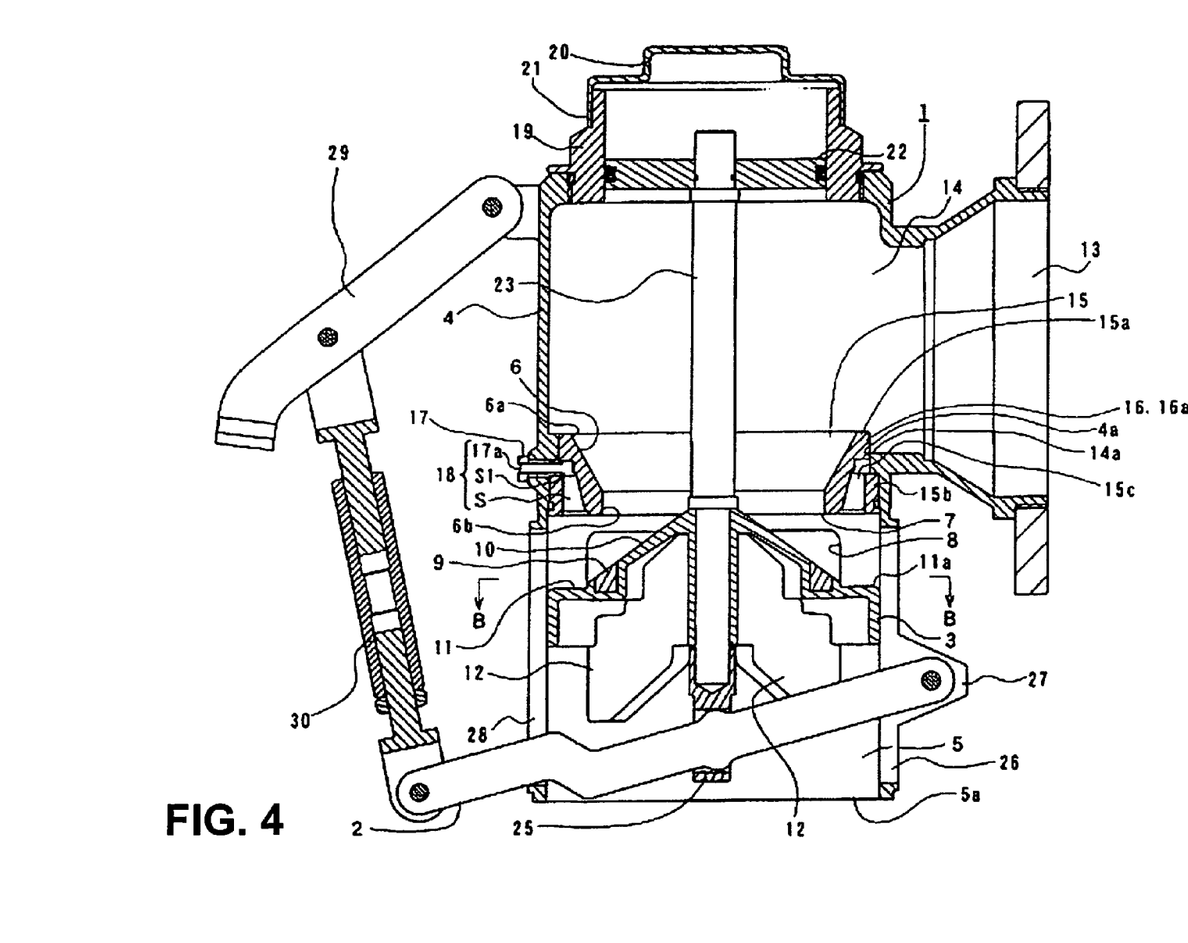
FIG. 4 is a central longitudinal sectional view of FIG. 2.
Figure 5:
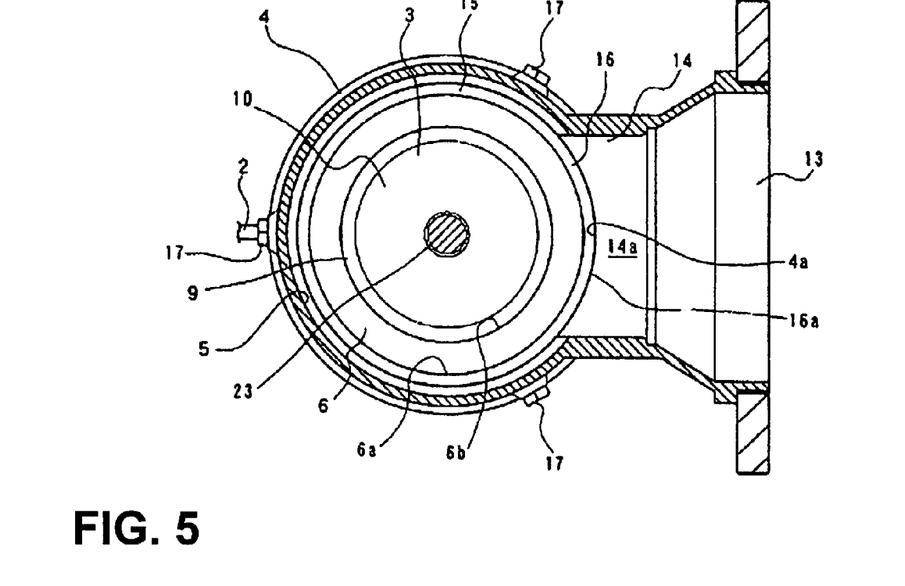
FIG. 5 is a sectional view taken along A-A in FIG. 3.
Figure 6:
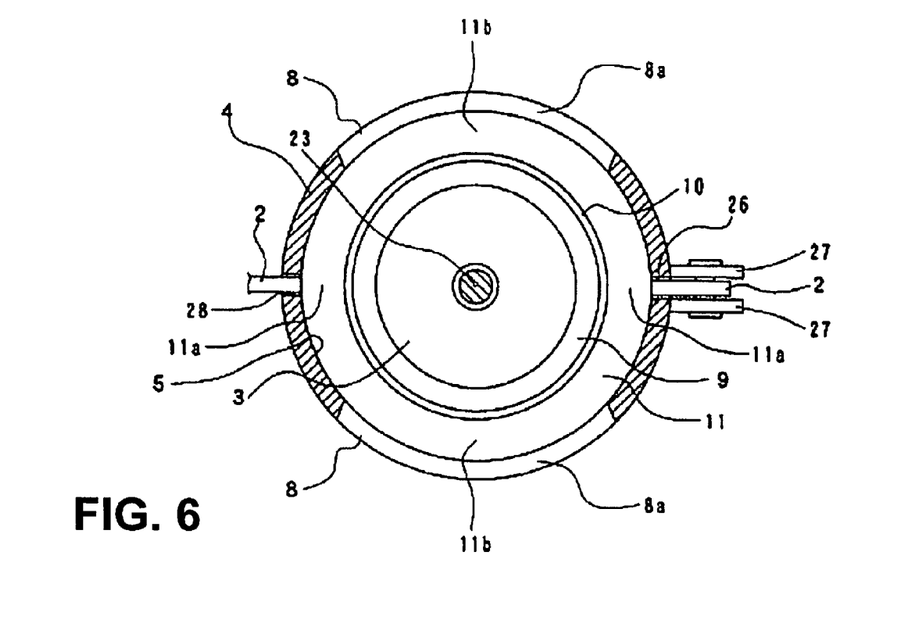
FIG. 6 is a sectional view taken along B-B in FIG. 4.
Figure 7:
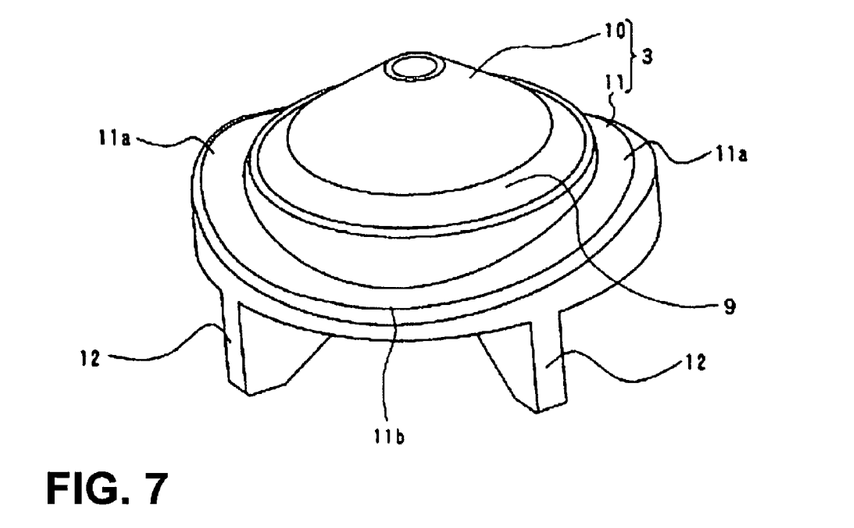
FIG. 7 is a perspective view of a valving element.

Accordingly, a dam 16a (having a minor-arc shape in plan view in FIG. 5) is formed by protruding the portion 14a corresponding to the inside corner portion in the primary side flow passage 14 on the rim 16 of the primary side opening 6a of the valve orifice 6 to be higher than the outfall 4a.

On the rim 16 of the primary side opening 6a of the valve orifice 6, a portion (having a major-arc shape in plan view in FIG. 5) except for the dam 16a is fitted onto and integrated with the inner wall of the primary side flow passage 14 constituting the outfall 4a.

In the outer wall of the valve body 4 corresponding to the annular space S1 surrounded by the inner wall of the outfall 4a in the seat ring 15, a plurality of (three in the illustrated example) screw holes are opened at equal intervals in the circumferential direction, and into these screw holes, ventilation screws 17 provided with penetration passages 17a on their axes are screwed until their tip ends enter the inside of the annular space S1.

The annular gap S and the annular space S1 that communicate with the outside air through the penetration passages 17a form a ventilation passage 18 provided around the secondary side opening 6a of the valve orifice 6, and enable air to mix in a water flow passing through the valve orifice 6 when the valving element 3 is opened.

To the upward opening of the valve body 4, a cylindrical cylinder 19 is inserted and joined in a watertight manner on the same axis as that of the secondary side flow passage 5, and on the upper end opening of the cylinder 19, a lid body 21 provided with a vent 20 that can communicate with the outside is covered.

Inside the valve body 4, the valving element 3 that can seat on and separate from the valve seat 7 by receiving a primary side pressure in the valve opening direction is provided slidably in the secondary side flow passage 5, and in the cylinder 19, a piston 22 that receives the primary side pressure in the valve closing direction is inserted and fitted slidably, and the piston 22 and the valving element 3 are joined to each other by a valve stem 23.

A valve rod 25 that is linked to the float 24 and inserted through and holds the lever rod 2 penetrating through the valve body (secondary side flow passage 5) in the front-rear direction (a diameter direction) above the lower end opening 5a of the secondary side flow passage 5 is provided so as to droop from the lower portion of the axis of the valving element 3.

The lever rod 2 has a base end inserted through a rear slit 26 opened vertically long in the rear portion of the valve body 4 and pivotally fitted between projecting pieces 27 that are provided on the left and right via the rear slit 26 so as to project, and a tip end side inserted through a front slit 28 opened vertically long in the front portion of the valve body 4.

On the other hand, to the upper side of the front portion of the valve body 4, the base end of the float lever 29 having a float 24 attached to the tip end is pivotally attached, and the base end side lower portion of the float lever 29 and the tip end portion of the lever rod 2 are pivotally attached and joined to each other by a link 30 with an adjustable length.

In the ball tap 1 constituted as described above, the float 24 moves up and down according to the level of water stored in the water receiving tank for clean water or recycled wastewater, and accordingly, in interlock with the lever rod 2 that swings vertically, the valving element 3 opens and closes the valve orifice 6 provided inside the valve body 4 to keep the water level inside the water receiving tank at a set water level.

When the level of the water stored in the water receiving tank becomes a low water level lower than the set water level, the float 24 moves down along with the water level and swings the lever rod 24 downward, and the valving element 3 linked to the lever rod 24 separates from the valve seat 7 and opens so as to open the valve orifice 6, and water is supplied into the water receiving tank through the valve orifice 6.

Then, since the inner circumferential surface of the valve orifice 6 slopes down toward the secondary side and the surface of the valving element 3 slopes down toward the secondary side, foreign matter easily slides and falls without adhering to and remaining on the surface of the valving element 3 and the inner circumferential surface of the valve orifice 6, and when the valving element 3 is opened, a water flow passing through the valve orifice 6 is made to flow down together with foreign matter mixed therein from the valve part 10 of the valving element 3 to the flange part 11 on the lower side (secondary side).

The flange part 11 is formed to have a circular ring shape in plan view so as to be slidable like a piston in the secondary side flow passage 5, so that the entire valving element 3 receives a water flow and prevents the water flow from flowing down to the secondary side of the valving element 3, and further, the upper surface of the flange part 11 has wave-like undulations so as to slope from the respective front and rear upper limit portions 11a to the left and right lower limit portions 11b, so that all of the water flow that is prevented from flowing to the downstream side by the valving element 3 as described above is bifurcated to the left and right along the slope and flows down to the drainage ports 8 disposed on the left and right.

Even if comparatively large foreign matter such as pebbles and leaves mix in the respective bifurcated flows, the lower limit portions 11b of the upper surface of the flange part 11 are set so as to be positioned at the same heights as those of the lower end edges 8a of the drainage ports 8 or slightly higher than the lower end edges 8a when the valving element 3 is fully opened, so that a failure in which the foreign matter that flowed down to the lower limit portions 11b together with the water flow remains there does not occur, and therefore, during opening of the valve, all of the foreign matter can always be discharged and removed to the outside from the drainage ports 8 disposed on the left and right of the upstream of the valving element 3, and thereafter, even during movement of the valving element 3 in the valve closing direction, fine foreign matter does not enter the gap between the flange part 11 and the secondary side flow passage 5 and obstruct sliding of the valving element in the secondary side flow passage 5.

Thus, a series of water channels can be constituted which can make foreign matter flow down to the lower limit portions 11a of the flange part 11 of the valving element 3 together with a water flow and can discharge all of the foreign matter to the outside from the left and right drainage ports 8 opened at the upstream of the valving element 3 being open in the secondary side flow passage 5, so that foreign matter can be prevented from being caught between the valving element 3 and the valve seat 7.

In addition, a ventilation passage 18 communicating with the outside air is provided around the secondary side opening 6b of the valve orifice 6, so that when the valve is opened, by a water flow passing through the valve orifice 6, the atmospheric pressure around the valve orifice 6 is lowered, and the water flow involves air supplied from the ventilation passage 18 around the valve orifice 6 and is made to flow down as bubbled water.

At this time, the water flow is a decreasing flow that is made smaller toward the downstream by the funnel shape of the valve orifice 6, so that the force of the water flow is increased and the atmospheric pressure around this water flow is significantly lowered, and therefore, air supplied through the ventilation passage 18 can be strongly involved in the water flow, and bubbled water which was increasingly mixed with air can be flowed down.

Then, bubbles which were increasingly mixed in the bubbled water can separate foreign matter that tries to adhere to the surface of the valving element 3, and accordingly, the foreign matter can be discharged together with the water flow from the drainage ports 8 to the outside without fail, and the foreign matter can be prevented from being caught between the valving element 3 and the valve seat 7.

The dam 16a provided at the portion 14a corresponding to the inside corner portion inside the primary side flow passage 14 on the rim 16 of the primary side opening 6a of the valve orifice 6 can dam up fine foreign matter such as sand contained in water to be supplied on the primary side so as to prevent the foreign matter from falling down to the surface of the valving element 3 being closed in the case where the opening degree of the valving element 3 is small and the water to be supplied on the primary side is small in amount, and prevents fine foreign matter from being caught between the valving element 3 and the valve seat 7 according to valve opening and closing operations of the valving element 3.

DESCRIPTION OF THE REFERENCE SYMBOLS

1 ball tap
2 lever rod
3 valving element
4 valve body
5 secondary side flow passage
5 valve orifice
6a primary side opening
7 valve seat
8 drainage port
8a lower end edge
8 contact projection part
10 valve part
11 flange part
11b lower limit portion
14 primary side flow passage
14a portion corresponding to inside corner portion
16a dam
18 ventilation passage

What is claimed is:

1. A ball tap for maintaining a predetermined water level inside a water receiving tank, said ball tap comprising a valving element linked to a lever rod that swings vertically according to the water level inside the water receiving tank in a manner enabling the valving element to seat on and separate from a valve seat provided on a secondary side opening end face of a valve orifice that opens on the same axis at that of a secondary side flow passage provided vertically inside a valve body, wherein the valving element includes a valve part provided with a contact projection part that can come into close contact with the valve seat when the valving element is closed, and a flange part having a circular ring shape in plan view which continues downward from a rim of the valve part and is slidable in the secondary side flow passage, and the left and right half circumferences of the upper surface of the flange part have bilaterally symmetrical shapes curved downward in arch shapes, and the left and right lower limit portions of the upper surface of the flange part are set so as to be positioned at the same heights as those of the lower end edges of drainage ports, wherein fluid is allowed to flow via the lower limit and the drainage ports when the valve is moved downward to the open position.

2. The ball tap according to claim 1, wherein the valve orifice is formed into a funnel shape that gradually decreases in diameter from its primary side opening toward the secondary side, the valve part of the valving element is formed into a right circular cone shape that gradually increases in diameter toward the secondary side, and the contact projection part is provided on a circumference of the valve part.

3. The ball tap according to claim 1, wherein a ventilation passage communicating with the outside air is provided around the secondary side opening of the valve orifice so as to allow air to mix in a water flow that passes through the valve orifice when the valve is opened.

4. The ball tap according to claim 1, wherein the valve body is formed in an angle in which a primary side flow passage whose axis is horizontal and the secondary side flow passage whose axis is vertical are orthogonal to each other, a dam is provided at a portion corresponding to the inside corner portion inside the primary side flow passage on the rim of the primary side opening of the valve orifice.

\* \* \* \* \*